United States Patent

Naito et al.

[11] Patent Number: 5,756,943
[45] Date of Patent: *May 26, 1998

[54] LOAD CELL

[75] Inventors: Kazufumi Naito; Michito Utsunomiya; Hiroyuki Konishi; Shotaro Tamai, all of Shiga, Japan

[73] Assignee: Ishida Co., Ltd., Kyoto, Japan

[*] Notice: The term of this patent shall not extend beyond the expiration date of Pat. No. 5,512,713.

[21] Appl. No.: 657,767

[22] Filed: May 31, 1996

Related U.S. Application Data

[63] Continuation-in-part of Ser. No. 341,032, Nov. 15, 1994, Pat. No. 5,539,158, which is a continuation of Ser. No. 996,644, Dec. 24, 1992, abandoned.

[30] Foreign Application Priority Data

Dec. 27, 1991 [JP] Japan ................... 3-360357
Aug. 6, 1992 [JP] Japan ................... 4-232841

[51] Int. Cl.$^6$ .................. G01G 3/14; G01G 3/08
[52] U.S. Cl. .................. 177/211; 177/229; 73/862.632
[58] Field of Search .................. 177/210 R, 211, 177/229; 73/862.632, 862.637, 862.68

[56] References Cited

U.S. PATENT DOCUMENTS

| | | | |
|---|---|---|---|
| 3,745,502 | 7/1973 | Watanabe et al. | 338/3 |
| 3,805,604 | 4/1974 | Ormond | 177/211 |
| 4,404,059 | 9/1983 | Livshits et al. | 177/211 |
| 4,475,610 | 10/1984 | Schwarzschild | 177/211 |
| 4,589,291 | 5/1986 | Sander | 73/862.65 |
| 4,657,097 | 4/1987 | Griffen | 177/211 |
| 4,785,673 | 11/1988 | Aumard | 73/862.65 |
| 5,220,971 | 6/1993 | Farr | 177/229 |
| 5,222,398 | 6/1993 | O'Brien | 73/862.632 |
| 5,512,713 | 4/1996 | Naito et al. | 177/211 |

FOREIGN PATENT DOCUMENTS

| | | |
|---|---|---|
| A0105564 | 4/1984 | European Pat. Off. . |
| A0227597 | 7/1987 | European Pat. Off. . |
| A56-72323 | 6/1981 | Japan . |
| A62-59767 | 12/1987 | Japan . |
| WO92 08115 | 5/1992 | WIPO . |

OTHER PUBLICATIONS

Communication from European Patent Office (Germany) Jan. 30, 1995, translated to English.
HBM Leaflet, "Dehnungsmesstreifen-Programm".
Extract Translation of "Dehnungsmesstreifen-Programm", p. 29, first 2 paragraphs, Mar. 15, 1995.

Primary Examiner—Michael L. Gellner
Assistant Examiner—Randy W. Gibson
Attorney, Agent, or Firm—Sughrue, Mion, Zinn, Macpeak & Seas, PLLC

[57] ABSTRACT

A load cell for use in detecting a load imposed thereon which includes a body (30) in which strain is induced in proportion to the imposed load, and a strain sensor (40) for detecting the strain induced in the body (30). The body (30) is a plate member having a longitudinal axis (X) and the strain sensor (40) is mounted on the body (30). The body (30) has an opening (31) defined therein at a location intermediate of the length of the body (30) so as to define a fixed rigid body forming region (70) at one end thereof, a movable rigid body forming region (71) at the opposite end thereof opposite to the fixed rigid body forming region (70) in the longitudinal direction (X), and side connecting strips (30b, 30b) spaced by the opening (31) from each other in a widthwise direction (Y) of the opening (31) and connecting the fixed rigid body forming region (70) and the movable rigid body forming region (71) together. The strain sensor (40) has opposite ends (41c) spaced in the longitudinal direction (X) and mounted on the body (30) with its opposite ends (41c) fixed to the fixed rigid body forming region (70) and the movable rigid body forming region (71).

10 Claims, 10 Drawing Sheets

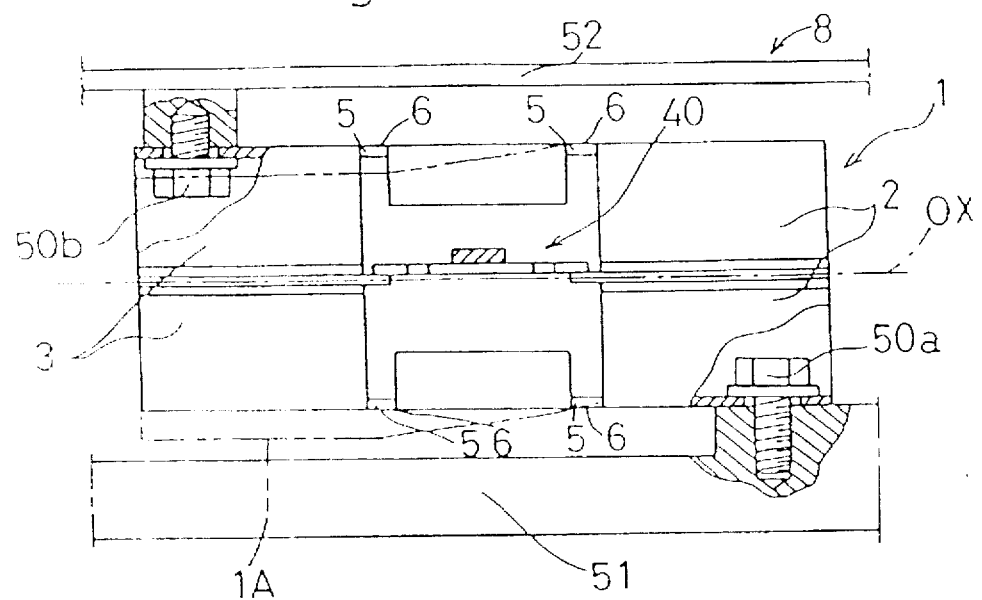
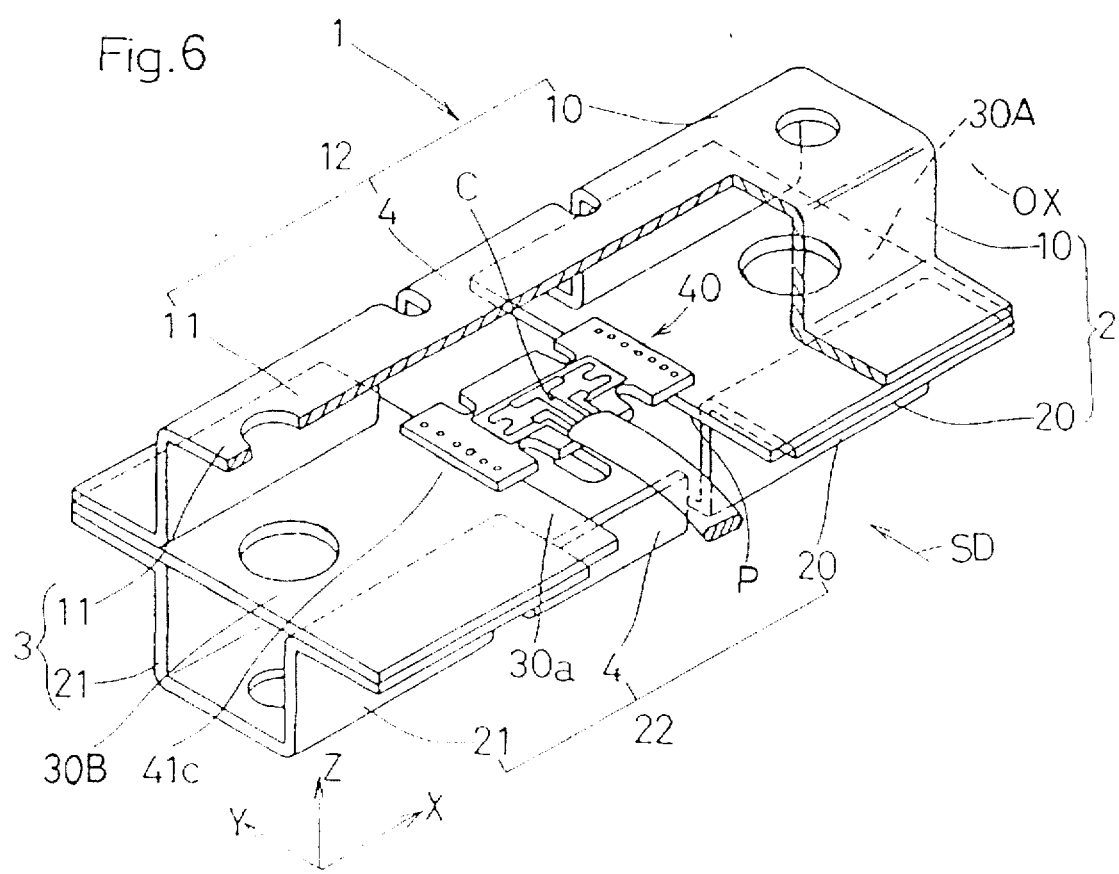

LOAD CELL

This is a Continuation-in-Part of application Ser. No. 08/341,032 now U.S. Pat. No. 5,539,158, filed Nov. 15, 1994 which is a Contination of application Ser. No. 07/996,644 filed Dec. 24, 1992 and abandoned.

BACKGROUND OF THE INVENTION

1. Field of the Invention

The present invention relates generally to a load cell for electrically detecting a load imposed on a strain inducing element of a specific configuration, by the utilization of an electric characteristic of a strain detecting element such as, for example, a strain gauge, mounted on the strain inducing element, and a load measuring apparatus using such load cell.

2. Description of the Prior Art

An electronic scale and a load detecting instrument such as, for example, a load sensor for measuring the applied external force generally make use of a load cell. Such a load cell used in the electronic scale generally comprises a strain inducing element A as shown in FIG. 15 so structured as to provide a well-known Roberval's parallel motion mechanism. Specifically, this strain inducing element A comprises fixed and movable rigid bodies a1 and a2 opposite to each other and a pair of parallel beams b1 and b2 extending between the fixed and movable rigid bodies a1 and a2. All of those elements a1, a2, b1 and b2 are defined by forming a cave C in a generally rectangular cubic metal block so that the fixed and movable rigid bodies a1 and a2 occupy respective opposite end portions of the metal block while the parallel beams b1 and b2 occupy respective opposite side portions of the metal block. The cave C is so shaped and so configured as to leave pairs of thin walled, low rigidity areas d1 and d2, d3 and d4, the low rigidity areas d1 and d2 of one pair being defined at respective junctions of opposite ends of the beam b1 with the fixed and movable rigid bodies a1 and a2 while the low rigidity areas d3 and d4 of the other pair are defined at respective junctions of opposite ends of the beam b2 with the fixed and movable rigid bodies a1 and a2.

The prior art strain inducing element A is so designed and so structured that, when a load W is applied to the movable rigid body a2 through a load receiving table F, a considerable deformation occurs at the thin-walled, low rigidity areas d1 to d4 as shown by the phantom line, causing the movable rigid body a2 to undergo a parallel downward motion relative to the fixed rigid body a1. In other words, the low rigidity areas d1 to d4 generate respective strains in a quantity proportional to the applied load W to reduce any possible adverse influence brought about by a bending moment. In practice, the fixed rigid body a1 of the strain inducing element A is rigidly secured to a base E of the electronic scale while the movable rigid body a2 is coupled with the load receiving table F. Strain detecting elements G such as, for example, strain gauges, are immovably placed on respective surfaces of the strain inducing element A in alignment with at least two of the low rigidity areas d1 and d2 (or d3 and d4) so that a tensile strain and a compressive strain induced in the low rigidity areas d1 and d2 as a function of the load placed on the load receiving table F can be detected by the respective strain detecting elements G thereby to provide an indication of the load W.

The strain inducing element A of the above discussed structure is formed by profiling and machining a block of material to a required shape, requiring a complicated tree-dimensional machining job accompanied by a reduced productivity. In view of this, the U.S. Pat. No. 4,785,673 (corresponding to the Japanese Laid-open Patent Publication No. 62-156532 published in 1987) discloses, in FIG. 7 thereof, a strain inducing element which is prepared by molding material by the use of an extrusion molding technique to provide a generally rectangular-sectioned member including a fixed rigidity portion, a movable rigidity portion opposite to the fixed rigidity portion and two parallel beams extending between the fixed and movable rigidity portions. A substrate is subsequently interposed between the parallel beams with a strain detecting element affixed thereto.

According to the above mentioned USP, since the strain detecting element is affixed to the substrate of a size comparable to that of the strain inducing element, a complicated job of fixing the strain detecting element resulting in a reduction in productivity as is the case with the prior art strain inducing element shown in FIG. 15 in which the strain detecting element is fixedly mounted on the beams.

SUMMARY OF THE INVENTION

Accordingly, a primary object of the present invention is to provide an improved load cell excellent in productivity and also to provide an improved load measuring instrument utilizing such improved load cell.

In order to accomplish this object, the present invention provides a load cell for use in detecting a load imposed thereon which includes a body in which strain is induced in proportion to the imposed load, and a strain sensor for detecting the strain induced in the body. The body is a plate member having a longitudinal axis and the strain sensor is mounted on the body. The body has an opening defined therein at a location intermediate of the length of the body so as to define a fixed rigid body forming region at one end thereof, a movable rigid body forming region at the opposite end thereof, and side connecting strips spaced by the opening from each other in a widthwise direction of the opening and connecting the fixed rigid body forming region and the movable rigid body forming region together. The movable rigid body forming region is located on one side of the opening opposite to the fixed rigid body forming region in the longitudinal direction of the body. The strain sensor has opposite ends spaced in the longitudinal direction and mounted on the body so as to bridge over the opening with its opposite ends fixed to the fixed rigid body forming region and the movable rigid body forming region.

According to another aspect of the present invention, there is provided a load measuring instrument in which the load cell of the kind referred to above is employed as a means for detecting a load imposed on a load receiving table.

According to the present invention, the body to which the strain sensor is fitted is employed in the form of a plate member and, therefore, it can be readily and easily obtained by the use of a two-dimensional, simple machining procedure, thereby increasing the productivity.

Also, since the strain sensor may be of a size so small as to permit it to bridge over the opening defined at the intermediate portion of the body, the strain detecting element can readily and easily be formed on the substrate by the use of, for example, any known thin-film technology, thereby increasing the productivity.

In addition, of the peripheral lip regions of the body defining the opening, the side connecting strips may have a varying width and/or a varying thickness so that the capacity of the load cell to measure the load, that is, the maximum detectable load, can be adjusted easily.

According to a preferred embodiment of the present invention, the strain sensor includes a substrate having opposite ends spaced in the longitudinal direction and a strain detecting element formed on the substrate. This strain sensor is mounted on the body with its opposite ends fixed to the fixed rigid body forming region and the movable rigid body forming region of the body.

Also, according to another preferred embodiment of the present invention, the substrate of the strain sensor has a low rigidity portion and the strain detecting element is positioned at the low rigidity portion to permit the amount of the strains to be increased to thereby increase the load detecting accuracy.

The low rigidity portion referred to above is preferably of a shape extending in a direction parallel to the widthwise direction of the substrate and is preferably provided in one pair spaced apart from each other in a direction parallel to the lengthwise direction of the substrate.

According to a further preferred embodiment of the present invention, the load cell further comprises a first member and a second member positioned above and below the body, respectively, and coupled with the body. The first member includes a fixed rigid body forming region connected with the fixed rigid body forming region of the body, a movable rigid body forming region connected with the movable rigid body forming region of the body, and an upper beam connecting the fixed rigid body forming region of the first member and the movable rigid body forming region of the first member together. The second member includes a fixed rigid body forming region connected with the fixed rigid body forming region of the body, a movable rigid body forming region connected with the movable rigid body forming region of the body, and a lower beam connecting the fixed rigid body forming region of the second member and the movable rigid body forming region of the second member together.

With this construction, by connecting the first and second members with the body, the strain inducing element can readily be assembled. Accordingly, no job of machining a one-piece material to provide the strain inducing element is needed in the practice of the present invention and, therefore, the process of making the strain inducing element can advantageously be simplified.

It is to be noted that since each of the first and second member and the body is preferably in the form of a plate member. Where the plate member is employed therefore, they can be manufactured by the use of any known press work, accompanied by a further increase in productivity.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 5 is a schematic side view, with portions shown in section, showing the load cell employed in a weighing apparatus;

FIG. 6 is a schematic perspective view of a load cell shown for comparison purpose;

DETAILED DESCRIPTION OF THE EMBODIMENTS

Figure 1:
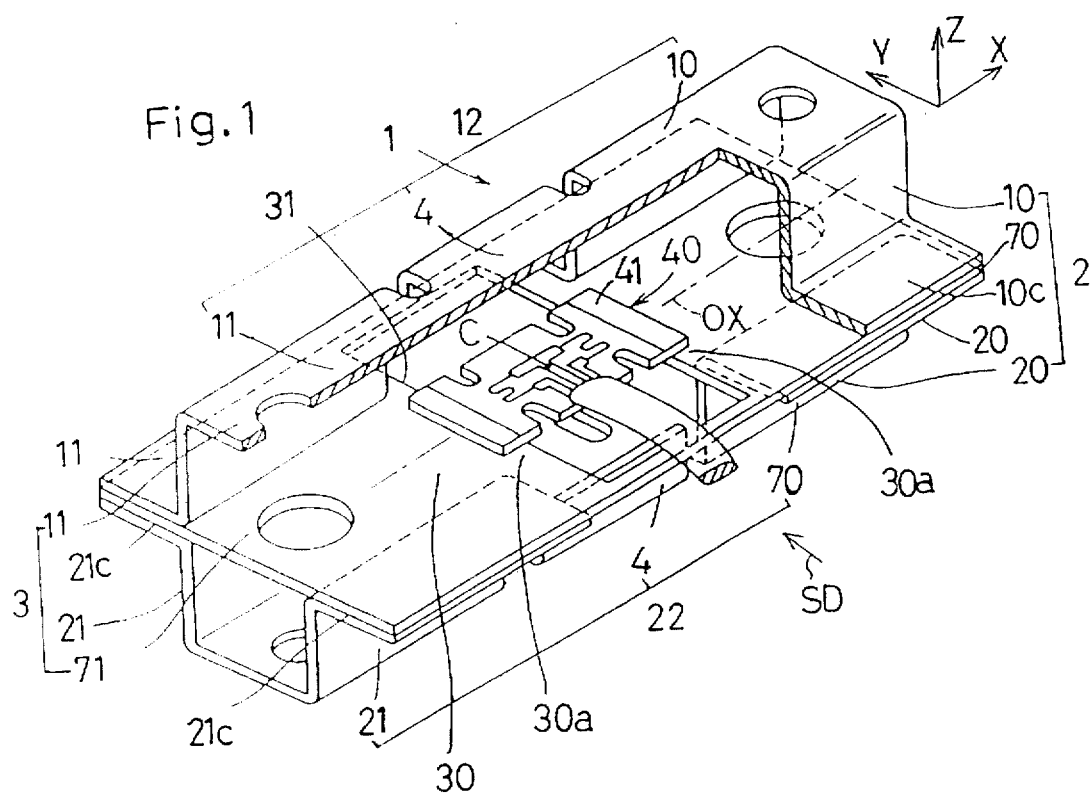
FIG. 1 is a schematic perspective view, with a portion cut away, showing a load cell according to a first preferred embodiment of the present invention.

Referring first to FIG. 1, a strain inducing unit 1 used in a load cell according to the present invention is of a generally elongated configuration having a longitudinal axis lying in a direction shown by arrow X. This strain inducing unit 1 has fixed and movable rigid bodies 2 and 3 occupying respective opposite ends of the strain inducing unit 1 which are spaced apart from each other in a longitudinal direction X thereof. This strain inducing unit 1 comprises a generally rectangular plate-like body 30 having a generally rectangular opening 31 defined as will be described later, and generally elongated upper (first) and lower (second) plate structures 12 and 22 of substantially identical construction. The upper plate structure 12 is positioned above the lower plate structure 22 so as to define a generally rectangular-sectioned hollow therebetween.

The plate-like body 30 has its opposite end portions defining respective rigid body forming regions 70 and 71 spaced apart in the lengthwise direction X; the upper plate structure 12 of one-piece construction has its opposite end portions defining fixed and movable rigid body forming regions 10 and 11 connected by an upper beam 4; and the lower plate structure 22 of one-piece construction has its opposite end portions defining respective fixed and movable rigid body forming regions 20 and 21 connected by a lower beam 4. The intermediate plate 30 is sandwiched between the upper and lower plate structures 12 and 22 with the fixed rigid body forming regions 70, 10 and 20 firmly joined together to define the movable rigid body 3 of the strain inducing unit 1 and, also, with the movable rigid body forming regions 71, 11 and 21 firmly joined together to define the fixed rigid body 2 of the strain inducing unit 1.

The body 30 made of a single plate member has a generally rectangular opening 31 defined at a location intermediate of the length of the body 30. A strain sensor 40 is fixed to the rigid body forming regions 70 and 71 of the plate-like body 30 so as to bridge over the opening 31.

In this construction, the generally rectangular-sectioned hollow so defined between the upper and lower plate structures 12 and 22 is symmetrical in configuration with respect to a geometric center point C thereof and is, with the plate-like body 30 intervening between the upper and lower plate structures 12 and 22, divided into upper and lower cavities of an identical and symmetrical shape; the upper cavity being defined between the upper plate structure 12 and the. plate-like body 30 and the lower cavity being defined between the lower plate structure 22 and the plate-like body 30. The plate-like body 30 has a cutout P defined therein and containing the geometric center point C.

Thus, the strain inducing unit. 1 represents a three-layered structure in which the plate-like body 30 intervene between the upper and lower structures 12 and 22 while the strain sensor 40 is positioned substantially intermediate of the height of the strain inducing unit 1 (as measured in a direction conforming to a vertical axis Z perpendicular to the longitudinal axis X) and in alignment with the mid-center line OX parallel to the longitudinal axis X and passing across the geometric center point C.

Figure 2:
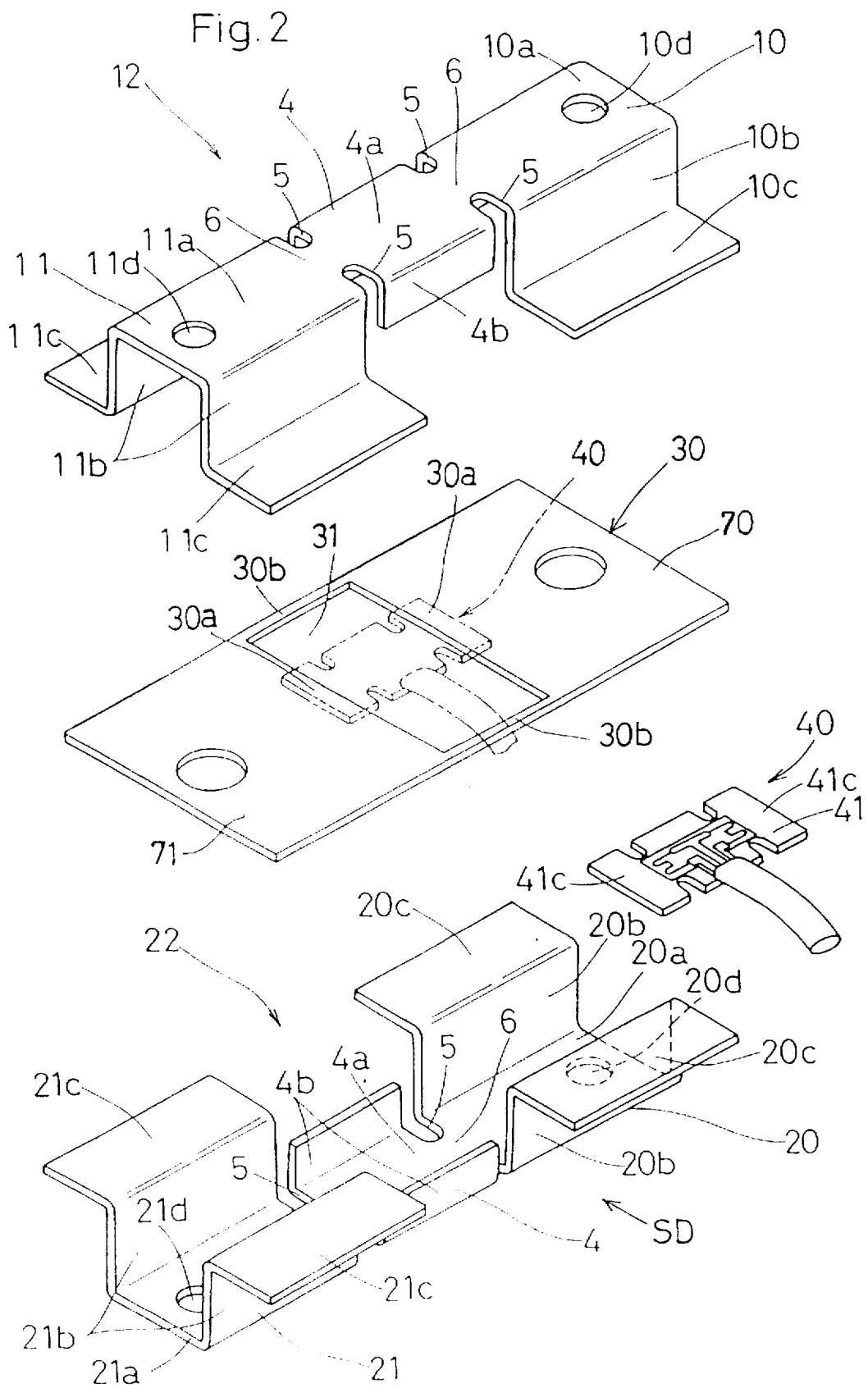
FIG. 2 is an exploded view of the load cell shown in FIG. 1.

The details of various component parts of the strain inducing unit 1 according to the present invention will now be described with particular reference to FIG. 2 showing an exploded view of the strain inducing unit 1.

The upper plate structure 12 has its opposite end portions constituting the respective fixed and movable rigid body forming regions 10 and 11. Each of the opposite end portions, that is, the fixed and movable rigid body forming regions 10 and 11, of the upper plate structure 12 is constituted by a top wall 10a or 11a, a pair of opposite side walls 10b or 11b substantially perpendicular to the top wall 10a or 11a, and a pair of flanges 10c or 11c protruding laterally outwardly from the associated side walls 10b or 11b and lying in a plane parallel to the top wall 10a or 11a. The top walls 10a and 11a of the respective fixed and movable rigid body forming regions 10 and 11 are connected together by means of the upper beam 4 which is constituted by a top wall 4a flush with any one of the top walls 10a and 11b and a pair of opposite side walls 4b normal to the top wall 4a. This upper plate structure 12 has two pairs of notches, generally identified by 5, each pair positioned on one side thereof with respect to the longitudinal axis of the upper plate structure 12 so as to define two constricted regions 6 of reduced width between the top walls 10a and 4a and between the top walls 11a and 4a.

It is to be noted that the upper plate structure 12 of the above described construction is symmetric in shape with respect to a vertical plane containing both of the longitudinal axis X and the vertical axis Z and also with respect to a vertical plane containing an axis Y which extends widthwise thereof so as to pass across the geometric center point C while extending perpendicular to both of the longitudinal and vertical axes X and Z, and that each of the constricted regions 6 has a reduced rigidity as compared with the remaining portion of the upper plate structure 12 and does therefore define a strain inducing area where stresses are easy to build up. It is also to be noted that each of the respective top walls 10a and 11a of the fixed and movable rigid body forming regions 10 and 11 has a bolt hole 10d or 11d defined therein for the passage therethrough of a respective fitting bolt (not shown).

Similarly, the lower plate structure 22 has its opposite end portions constituting the respective fixed and movable rigid body forming regions 20 and 21. Each of the opposite end portions, that is, the fixed and movable rigid body forming regions 20 and 21, of the lower plate structure 22 is constituted by a bottom wall 20a or 21a, a pair of opposite side walls 20b or 21b substantially perpendicular to the bottom wall 20a or 21a, and a pair of flanges 20c or 21c protruding laterally outwardly from the associated side walls 20b or 21b and lying in a plane parallel to the bottom wall 20a or 21a. The bottom walls 20a and 21a of the respective fixed and movable rigid body forming regions 20 and 21 are connected together by means of the lower beam 4 which is constituted by a bottom wall 4a flush with any one of the bottom walls 20a and 21b and a pair of opposite side walls 4b normal to the bottom wall 4a. This lower plate structure 22 has two pairs of notches, generally identified by 5, each pair positioned on one side thereof with respect to the longitudinal axis of the lower plate structure 22 so as to define two constricted regions 6 of reduced width between the bottom walls 20a and 4a and between the bottom walls 21a and 4a.

It is to be noted that the lower plate structure 22 of the above described construction is of a construction substantially identical with the upper plate structure 12 and is symmetric in shape with respect to the vertical plane containing both of the longitudinal and vertical axes X and Z and also with respect to a vertical plane containing the axis Y which extends widthwise thereof so as to pass across the geometric center point C while extending perpendicular to both of the longitudinal and vertical axes X and Z, and that each of the constricted regions 6 has a reduced rigidity as compared with the remaining portion of the lower plate structure 22 and does therefore define a strain inducing area where stresses are easy to built up. It is also to be noted that each of the respective bottom walls 20a and 21a of the fixed and movable rigid body forming regions 20 and 21 has a bolt hole 20d or 21d defined therein for the passage therethrough of a respective set bolt (not shown).

The plate-like body 30 in the form of a single plate as described above has the rectangular opening 31 defined therein at a location intermediate of the length thereof. Formation of the rectangular opening 31 in the plate-like body 30 separates the fixed rigid body forming regions 70 and 71 on respective sides of the rectangular opening 31 in the lengthwise direction X. More specifically, the plate-like body 30 shown therein has an intermediate portion blanked off to define the generally rectangular opening 31 therein while leaving a pair of opposite connecting strips 30b spaced from each other in the widthwise direction Y. Opposite peripheral lip regions of the plate-like body 30 defining the opening 31 and spaced from each other in the longitudinal direction X, form respective mounts 30a. The opposite ends of the strain sensor 40 are welded to the respective mounts 30a to permit the strain sensor 40 to be supported by the plate-like body 30 so as to bridge over the opening 31.

To complete the strain inducing unit 1, the plate-like body 30 with the strain sensor 40 installed is sandwiched between the upper and lower plate structures 12 and 22 with flanges 10c and 11c of the upper plate structure 12 spot-welded together with the associated flanges 20c and 21c of the lower plate structure 22. At this time, opposite side edge portions of the plate-like body 30 are sandwiched between the flanges 10c and 11c of the upper plate structure 12 and the flanges 20c and 21c of the lower plate structure 22 and are then welded thereto. In this way, the strain inducing unit 1 with the strain sensor 40 is completely assembled.

The strain inducing unit 1 of the construction described above is so designed and so structured as to constitute a Roberval's parallel motion mechanism. In other words, the strain inducing unit 1 is so designed and so structured that, when a load is imposed on the movable rigid body 3, the strain inducing unit 1 undergoes a considerable bending about the four constricted or strain inducing areas 6 in the upper and lower plate structures 12 and 22 while the movable rigid body 3 moving downwardly and generally parallel relative to the fixed rigid body 2.

Figure 3:
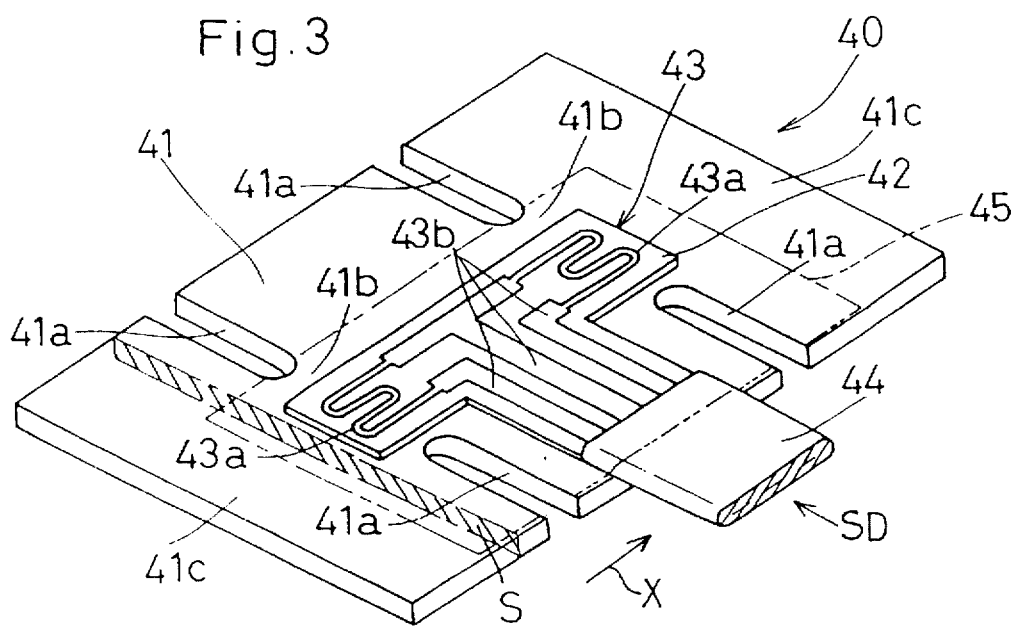
FIG. 3 is a schematic perspective view of a strain sensor used in the load cell of the present invention.

Referring now to FIG. 3 for the detailed discussion of the strain sensor 40, the strain sensor 40 comprises a substrate 41 of a metallic material in the form of a generally rectangular thin plate having its opposite side edge portions formed with respective pairs of notches generally identified by 41a. The notches 41a of each pair are aligned with each other so as to leave between the notches 41a of the respective pair an associated constricted area 41b which extends inwardly from the associated side edge of the metal substrate 41 so as to extend in a widthwise direction Y perpendicular to the longitudinal axis X of the metal substrate 41. Each constricted area 41b serves as a low rigidity area where stresses are easy to build up.

This strain sensor 40 also comprises a strain detecting unit 43 mounted on the metal substrate 41 through an electric insulator layer 42 so as to extend generally between the constricted or stress generating areas 41b. The strain detecting unit 43 is formed by depositing electroconductive metal foil in a predetermined pattern on the electric insulator layer 42 by the use of, for example, a circuit printing technique or a lithographic technique and includes a pair of strain detecting resistance elements 43a and electric conductors 43b which connect the strain detecting resistance elements 43a with a flat cable or a flexible ribbon cable 44 having a corresponding number of electric lines connected, or otherwise soldered, with the conductors 43b. This strain detecting unit 43 is so designed that, when a strain acts on the strain detecting unit 43, electric signals each indicative of a change in resistance of the associated strain detecting resistance elements 43a can be outputted through the flat cable 44. Preferably, the strain detecting unit 43 on the electric insulator layer 42 is protected by a protective overcoat 45 of any suitable electrically insulating material.

So far as described, when a load is applied to the load receiving table as will be described later, the movable rigid body 3 shown in FIG. 1 is displaced downwardly relative to the fixed rigid body 2, accompanied by a corresponding downward displacement of the mount 30a of the plate-like body 30 adjacent the movable rigid body 3 relative to the mount 30a of the plate-like body 30 adjacent the fixed rigid body 2. When this downward displacement of the movable rigid body 3 relative to the fixed rigid body 2 takes place, the strain sensor 40 is deformed in a manner generally depicting the shape of a figure "S", as viewed from lateral direction SD, with the consequence that a tension acts on the constricted or low rigidity area 41b (FIG. 3) of the metal substrate 41 adjacent the fixed rigid body 2 whereas a compression acts on the low rigidity area 41b of the metal substrate 41 adjacent the movable rigid body 3. This deformation of the strain sensor 40 results in respective changes in resistance of the electric resistance elements 43a which are subsequently outputted through a Wheatstone bridge network shown in FIG. 4.

Figure 4:
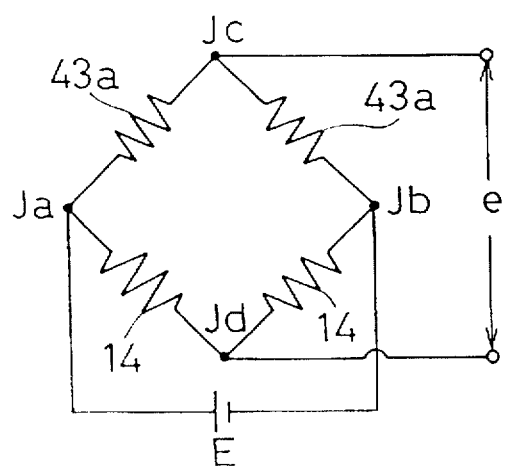
FIG. 4 is a circuit diagram showing a load detecting circuit in which the load sensor is employed.

Thus, with reference to FIG. 4, the electric resistance elements 43a are connected in series with each other through a junction Jc to form a series circuit which is in turn connected with a series circuit of dummy resistors 14 connected with each other through a junction Jd, thereby to form the Wheatstone bridge network. In this Wheatstone bridge network shown in FIG. 4, a predetermined voltage E is applied between a junction Ja of one of the strain detecting resistance elements 43a with one of the dummy resistors 14 and a junction Jb of the other of the strain detecting resistance elements 43a with the other of the dummy resistors 14, an output voltage e, that is, an electric output signal as a function of the load imposed thereon, can be generated between the junctions Jc and Jd in correspondence with a change in resistance of each of the strain detecting resistance elements 43a. This electric output signal is eventually processed to provide a measurement of the load imposed on the strain inducing unit 1 of the present invention.

The strain sensor 40 shown in FIG. 3 is supported within the rectangular-sectioned hollow by the plate-like body 30, shown in FIG. 2, with opposite end portions 41c of the metal substrate 41 mounted on and spot-welded to the respective mounts 30a by the use of any suitable welding technique such as, for example, a YAG welding technique or an electron beam welding technique.

Referring now to FIG. 5, the strain inducing unit 1 in an assembled condition is mounted on a base plate 51, forming apart of an electronic scale, by means of a set bolt 50a passing through the fixed rigid body 2 and fastened to the base plate 51 from above. On the other hand, the strain detecting unit 1 is secured to a load receiving table or a scale table 52, also forming another part of the electronic scale, by means of a set bolt 50b passing through the movable rigid body 3 and fastened to the scale table 52 from below. Thus, it will readily be understood that, when an object to be weighed is placed on the scale table 52, the movable rigid body 3 moves downwardly and generally parallel relative to the fixed rigid body 2 as shown by the phantom line 1A, accompanied by a generation of a substantial amount of strain which is detected by the strain sensor 40. In this way, the load imposed on the movable rigid body 3, that is, the weight of the object to be weighed that is placed on the scale table 52, is measured by processing the electric output signal generated from the strain sensor 40.

Preferably, to manufacture the strain sensor 40, a method may be employed which comprises the steps of forming a plurality of strain detecting units 43 on a single metal matrix and then cutting the metal matrix to produce the individual strain detector assemblies 40 each including the metal substrate 40 with the strain detecting unit 43 formed thereon. This method permits the manufacture of a plurality of the strain sensor 40 using a single metal matrix and is therefore advantageous in terms of productivity.

The strain inducing unit 1 including the upper and lower plate structures 12 and 22 and the plate-like body 30 is preferably made of stainless steel, but may be made of any known suitable metal such as, for example, aluminum. Similarly, the metal substrate 41 forming a part of the strain sensor 40 is preferably made of the same metal as that used for the strain inducing unit 1, that is, stainless steel, but may be made of any other suitable metal such as, for example, aluminum.

The electric insulator layer 42 forming another part of the strain sensor 40 may be made of any suitable synthetic resin having an electrically insulating property such as, for example, polyimide resin, polyester resin, phenol resin, or epoxy resin.

The strain detecting resistance elements 43a also forming another part of the strain sensor 40 is made of metal such as, for example, tantalum nitride, copper-nickel alloy or nickelchromium alloy while the conductors 43b are made of metal having a high electroconductive property such as, for example, aluminum.

The protective overcoat 45 deposited on the electric insulator layer 42 so as to cover the strain sensor 40 is made of any one of synthetic resins such as, for example, solder-resist, butyl rubber and silicon rubber, or a combination of them.

According to the structure described above, the plate-like body 30 employed in the strain inducing unit 1 shown in FIG. 1 operates in the following manner. When the movable rigid body forming region 71 of the plate-like body 30 is displaced downwardly relative to the fixed rigid body forming region 70 thereof in proportion to the applied load, the strain in a quantity proportional to the applied load is generated from the strain detecting unit 43 located at the low rigidity areas 41b of the strain sensor 40. The strain so generated is converted into an electric signal by the circuit shown in FIG. 4.

In addition, the upper and lower plate structures 12 and 22 shown in FIG. 2 have the strain inducing areas 6 defined between the top walls 10a and 4a in the upper plate structure 12 and between the bottom walls 20a and 4a in the lower plate structure 22, so that the movable rigid body 3 can move downwardly and generally parallel relative to the fixed rigid body 2 according to the load imposed thereon. Since the strain inducing unit 1 of the above described construction is of a symmetrical structure with respect to the geometric center point C (See FIG. 1), allowing the strain inducing unit 1 as a whole to constitute the Roberval's parallel motion mechanism, the strain induced in the strain detecting unit 43 is accurately in proportion to the load to be measured and, therefore, a precise and accurate detection of the load can advantageously be accomplished with minimized adverse effect of a moment of the load.

Also, since the metal substrate 41 of the strain sensor 40 is disposed in alignment with the mid-center line OX parallel to the lengthwise direction of the strain inducing unit 1 and is positioned at a location substantially intermediate of the height of the strain inducing unit 1, the extent to which the strain sensor 40 may be adversely affected by the bending moment acting in the strain inducing unit 1 can be advantageously minimized accurately, resulting in an increase in load detecting accuracy. It is to be noted that, since the metal substrate 41 forming a part of the strain sensor 40 is not a structural element for supporting the applied load, it is possible to employ it in the form of a thin plate member and, also, the metal substrate 41 of the strain sensor 40 can be positioned as close to the mid-center line OX as possible.

Moreover, since the metal substrate forming a part of the strain sensor 40 shown in FIG. 4 is in the form of the thin metallic plate having the low rigidity areas 41b which generate the strain as a result of the stress build-up and the strain detecting unit 43 is positioned at that low rigidity area 41b, a substantially increased amount of strain acts on the strain detecting unit 43, making it possible to accomplish the precise and accurate detection of the load.

Yet, since the metallic plate 41 has a sufficiently small thickness and also has a cross-sectional surface area S which is of a size small enough to avoid the possibility that the amount of strain induced in the strain inducing unit 1 will be adversely affected, the accuracy of the load detection will not be reduced.

Furthermore, while the strain inducing unit 1 in FIG. 1 is substantially made of metal, the strain detecting unit 43 of the strain sensor 40 shown in FIG. 3 is formed on the metal substrate 41 which is in turn mounted in the strain inducing unit 1 by the use of the welding technique in the manner as described hereinbefore. The welding job employed to secure the strain sensor 40 to the plate-like body 30 involves an easy mechanical handling and, therefore, the productivity of the load cell according to the present invention can advantageously be increased.

Also, the metal substrate 41 forming a part of the strain sensor 40 is held in contact with the plate-like body 30 merely through the opposite end portions 41c thereof that are welded to the associated mounts 30a of the plate-like body 30, a major portion of said metal substrate 41 is held out of contact with the plate-like body 30. Therefore, the metal substrate 41 is substantially insensitive to any possible load-induced deformation which would otherwise occur when a large back surface area of the metal substrate 41 opposite to the strain sensor 40 is brought into frictional contact with the plate-like body 30, thereby making it possible to accomplish a precise and accurate detection of the load.

Considering that the metal substrate 41 on which the strain detecting unit 43 is formed through the electric insulator layer 42 is made of the same metallic material, that is, stainless steel, as that for the strain inducing unit 1, the metal substrate 41 exhibits the same coefficient of thermal expansion as that exhibited by the strain inducing unit 1 and, therefore, any possible change in amount of strain detected by the strain detecting unit 43 which would occur as a result of a change in ambient temperature regardless of the load-induced strain can be minimized or substantially eliminated, with the strain sensor 40 consequently exhibiting a favorable temperature dependent characteristic.

Furthermore, since the metal substrate 41 has its opposite end portions welded to the plate-like body 30 with the region of the strain detecting unit 43 positioned clear from the plate member 30, the strain detecting unit 43 will not be adversely affected by and undesirably deformed by the elevated temperature in the presence of a welding heat generated during the welding job.

The use of the protective overcoat 45 covering the strain detecting unit 43 is effective to avoid any possible reduction in detecting capability of the strain detecting unit 43 which would occur when adversely affected by humidity, thereby ensuring a stable functioning of the strain detecting unit 43 for a prolonged time.

Yet, since the spot-welding technique is employed to secure the metal substrate 41 to the plate-like body 30, the entire surface area occupied by spot-weld joints between the metal substrate 41 and the plate-like body 30 is much smaller than that which would be occupied when a seam welding is effected. Where the seam welding technique occupying a large welding area is employed to weld the metal substrate 41 to the plate-like body 30, there is a possibility that a deviation occurring between the metal substrate 41 and the plate-like body 30 when the strain inducing unit 1 undergoes a deformation will not be sufficiently absorbed and a frictional contact between the metal substrate 41 and the plate-like body 30 would hamper a deformation of the strain inducing unit 1 according to the load imposed thereon. The use of the spot-welding technique occupying a small welding area for welding the metal substrate to the plate-like body 30 is effective to avoid such a possibility, making it possible to secure the precise and accurate load detection.

Also since welding area of the spot welding is small as compared with the seal welding, internal stresses which would occur in the metal substrate 41 is suppressed thereby minimizing an adverse effect of the internal stresses on the deformation of the strain inducing unit 1. In addition, since the YAG welding technique does not result in a build-up of weld strains in the vicinity of welded sites, the linearity of deformation of the strain inducing unit 1 will not be deteriorated.

Moreover, since the strain inducing unit 1 as a whole has a symmetrical profile with respect to the geometric center point C, both of the upper plate structure 12 and the lower plate structure 22, which form the respective upper and lower portions of the fixed and movable rigid bodies 2 and 3, can be manufactured by the use of a single and the same die and punch and, therefore, the present invention is effective to enhance the production of the strain inducing unit 1 and, hence, the load cell using the same, accompanied by a reduction in the manufacturing cost of the load cell.

Also, since the plate-like body 30 is employed in the form of the plate member, it can be obtained by a simple, two-dimensional machining and, therefore, the productivity is high.

Again, it is pointed out that since the plate-like body 30 is in the form of the single metal plate having the opening 31 defined therein, the strain sensor 40 is mounted on the plate-like body 30 so as to bridge over the opening 31. Accordingly, as compared with the comparison shown in FIG. 6 in which the plate-like body is employed in the form of first and second plate-like bodies 30A and 30B supported respectively by a fixed rigid body 2 and a movable rigid body 3 so as to form a gap P between these first and second plate-like bodies 30A and 30B and a strain sensor 40 is mounted so as to bridge over the gap P, the present invention dispenses with the requirement that the three members, that is, the first and second plate-like bodies 30A and 30B and the strain sensor 40, have to be properly positioned relative to each other such as required in the comparison shown in FIG. 6. Contrary thereto, the present invention merely requires the mounting of the strain sensor 40 on the plate-like body 30 in the manner hereinbefore described with no complicated and time-consuming positioning required. Thus, according to the present invention, the strain sensor 40 can easily be positioned relative to the single plate-like body 30, accompanied by an increased ease to assembly the load cell with an improved productivity.

According to the comparison shown in FIG. 6, if the first and second plate-like bodies 30A and 30B are sandwiched between the upper and lower plate structures 12 and 22 while an assembly error is present between the first and second plate-like bodies 30A and 30B, that is, while the first and second plate-like bodies 30A and 30B are displaced relative to each other, the respective positions at which the first and second plate-like bodies 30A and 30B are disposed are regulated by the upper and lower plate structures 12 and 22 so that an unnecessary initial load will act on the strain sensor 40 as a result of the presence of the assembly error. Once this occurs, the strain sensor 40 may be damaged or will give rise to an incorrect measurement accompanied by a reduction in load detecting accuracy. This possibility does not occur according to the present invention.

More specifically, in the practice of the present invention, since the strain sensor 40 is mounted on the single plate-like body 30 so as to bridge over the opening 31 defined therein and the resultant assembly is subsequently sandwiched between the upper and lower plate structures 12 and 22, no unnecessary initial load act on the strain sensor 40, resulting not only in an increase in durability of the strain sensor 40 and, hence, that of the strain inducing unit 1, but also in an increased load detecting accuracy. In particular, since the plate-like body 30 has the side connecting strips 30b adjacent the opposite ends of the opening 31 in the widthwise direction thereof, twisting of the plate-like body 30 about the longitudinal axis thereof extending in the lengthwise direction X hardly occurs and, accordingly, any possible measurement error which would be produced by the strain sensor 40 as a result of twisting can advantageously be suppressed.

It is to be noted that, if in the practice of the present invention the size of each of the connecting strips 31a connecting the opposite end portions of the plate-like body 30 is properly chosen, not only can the capacity of the load cell to weigh (the maximum detectable load) be changed easily, but also a thermal conductivity of the strain sensor 40 and the strain inducing unit 1 as a whole can be controlled, thereby permitting the strain inducing unit 1 to exhibit a thermal stability against a change in temperature. In this way, using the plural strain sensors 40 of the same construction, a number of the load cells having their own weighing capacity can be obtained.

Figure 7:
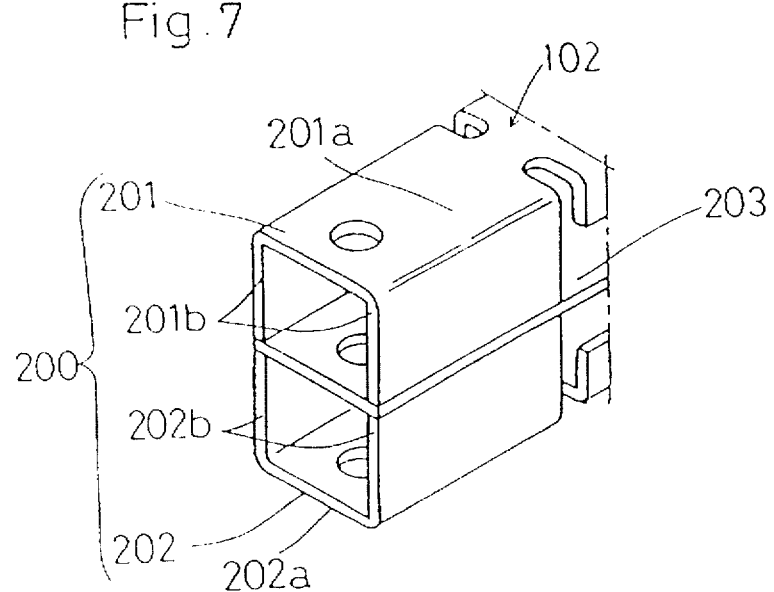
FIG. 7 is a fragmentary perspective view showing a modified form of one of fixed and movable rigid bodies forming respective parts of the load cell of the present invention.

In the foregoing embodiment of the present invention, each of the upper and lower plate structures 12 and 22 has been shown and described as having flanges for connecting the upper and lower plate structures together with the plate-like body 30 sandwiched therebetween. However, each end portion of each of the upper and lower plate structures and the plate-like body may be modified according to a second preferred embodiment of the present invention shown in FIG. 7. In the embodiment of FIG. 7, no flanges such as employed in the foregoing embodiment of the present invention is employed.

Referring now to FIG. 7, only one end portion of each of the upper and lower plate structures 201 and 202 which forms the fixed or movable rigid bodies 200 is shown for the sake of brevity. An upper end portion of the fixed or movable rigid body 200 is formed by a corresponding upper rigid body forming region 201 having a top wall 201a and a pair of opposite side walls 201b substantially perpendicular to the top wall 201a and, similarly, a lower portion of each of the fixed and movable rigid bodies 200 is formed by a corresponding lower rigid body forming region 202 having a bottom wall 202a and a pair of opposite side walls 202b substantially perpendicular to the bottom wall 202a. The plate-like body 30 in the form of a single plate has a width corresponding to the span between the side walls 201b of each of the upper and lower rigid body forming regions 201 and 202, having its side edges sandwiched and welded in position between the side walls 201b and 202b.

According to the modification of the present invention shown in and described with reference to FIG. 7, since no flange is employed in each of the upper and lower plate structures, it is evident that the strain inducing unit 101 has a light-weight feature.

Figure 8:
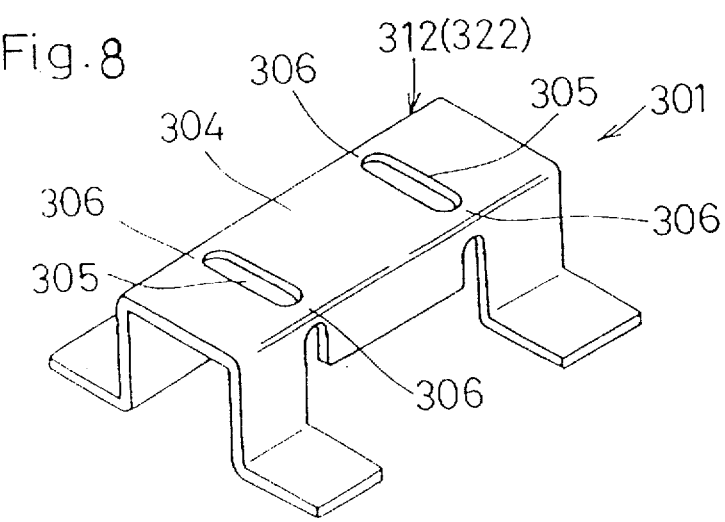
FIG. 8 is a fragmentary perspective view showing a modified form of one of beam members forming respective parts of the load cell of the present invention.

Also, in the foregoing embodiment of the present invention, the pairs of the notches have been described as formed in each of the upper and lower plate structures to define the two constricted areas (low rigidity areas) of reduced width. However, in a second modified form of the present invention shown in FIG. 8, each of the upper and lower plate structures 312 and 322 of the strain inducing unit 1 (only the upper one 312 is shown in FIG. 8) has a beam portion 304 in which a pair of slots 305, each having a pair of rounded ends opposite to each other, are defined so as to extend perpendicular to the longitudinal axis X of the plate structure, thereby leaving the pairs of the constricted areas (strain generating areas) 30b, one pair on each side thereof.

Figure 9:
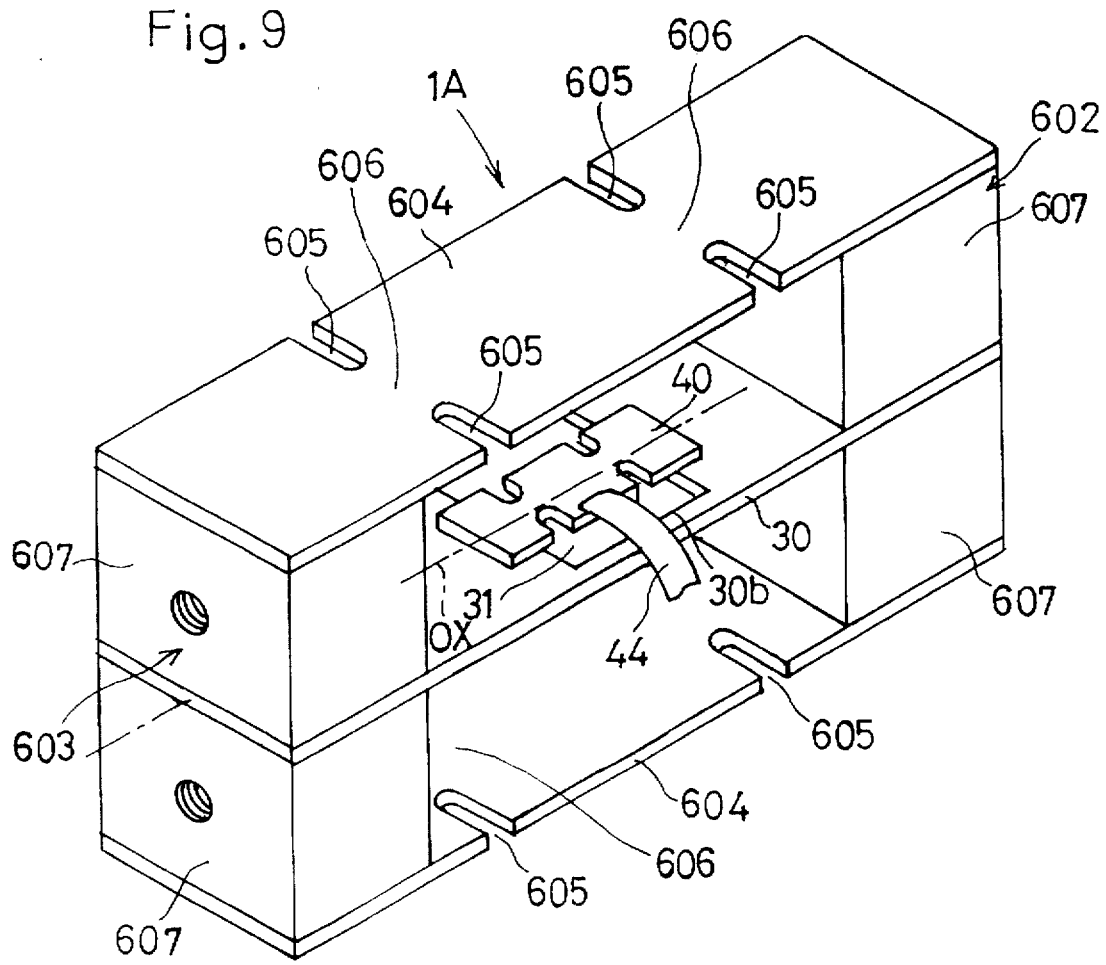
FIG. 9 s a schematic perspective view of the load cell according to a second preferred embodiment of the present invention.

FIG. 9 illustrates the load cell according to a second preferred embodiment of the present invention. The strain inducing unit 1A employed in the practice of this embodiment of the present invention includes upper and lower beam plates 604 positioned above and below the plate-like body 30. Each of the beam plates 604 is formed with two pairs of slits 605 so as to extend inwardly from opposite side edges thereof, each pair of said slits 605 terminating spaced a part from each other so as to define a corresponding strain generating area 606 between the slits 605.

The upper and lower beam plates 604 are connected at one end with the plate-like body 30 by means of respective connecting blocks 607 that are positioned adjacent the fixed rigid body 602 of the resultant strain inducing unit 1A and are also connected at the opposite end with the plate-like body 30 by means of respective connecting blocks 607 that are positioned adjacent the movable rigid body 603 of the resultant strain inducing unit 1A. The strain sensor 40 is fixed to the plate-like body 30. In such case, the strain sensor 40 is positioned in alignment with the center line OX parallel to the lengthwise direction of the strain inducing unit 1A, that is, positioned intermediate of the height of the strain inducing unit 1A.

Figure 10:
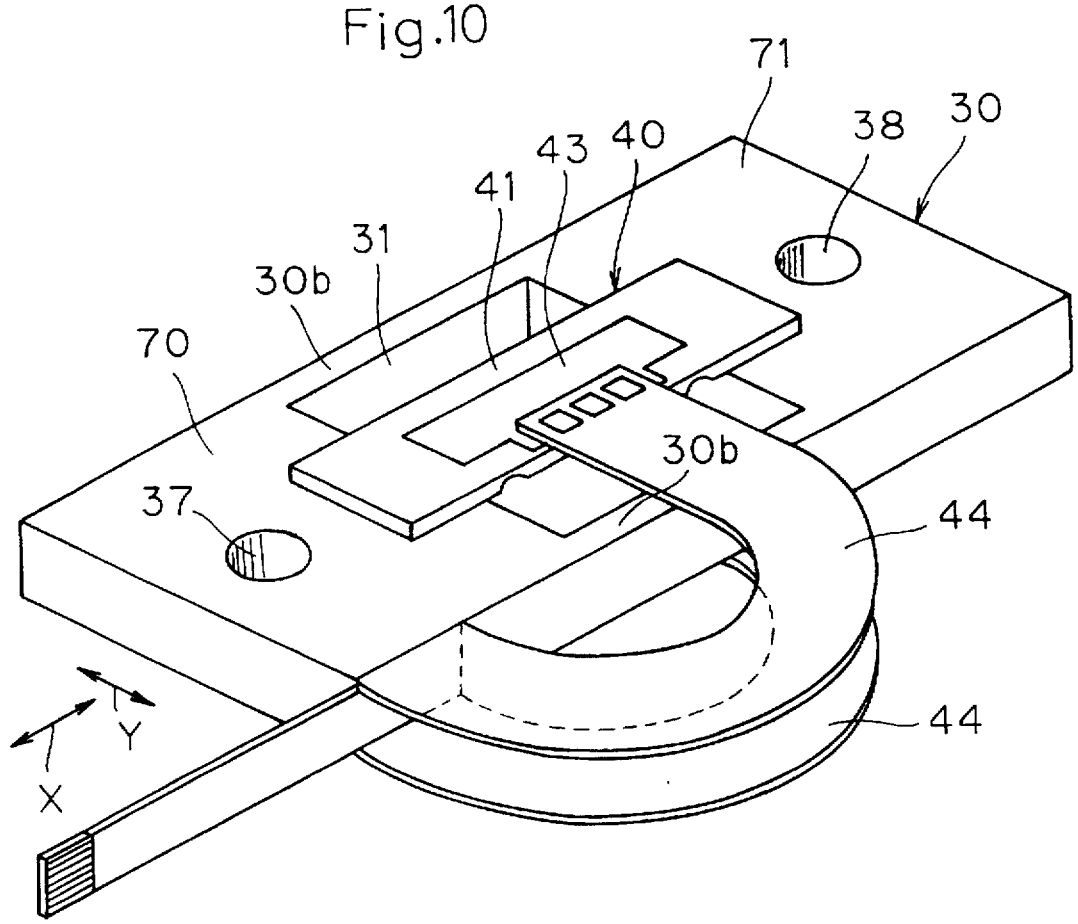
FIG. 10 is a schematic perspective view of the load cell according to a third preferred embodiment of the present invention.

FIG. 10 illustrates the load cell according to a third preferred embodiment of the present invention. The strain inducing unit 1B shown therein comprises the plate-like body 30 in the form of a rectangular plate member of, for example, stainless steel and has the fixed rigid body forming region 70 and a movable rigid body forming region. 71 opposite to the fixed rigid body forming region 70. The fixed and movable rigid body forming region 70 and 71 are formed with bolt holes 37 and 38 for passage therethrough of mounting bolts used to secure a fixing bracket 51 and a load receiving bracket 52, respectively, said fixing bracket 51 and said load receiving bracket 52 being shown in FIG. 11. The fixed and movable rigid body forming regions 70 and 71 of the plate-like body 30 are reversed in position in the longitudinal direction X relative to those of the plate-like body 30 employed in any one of the foregoing embodiments of the present invention.

Figure 11:
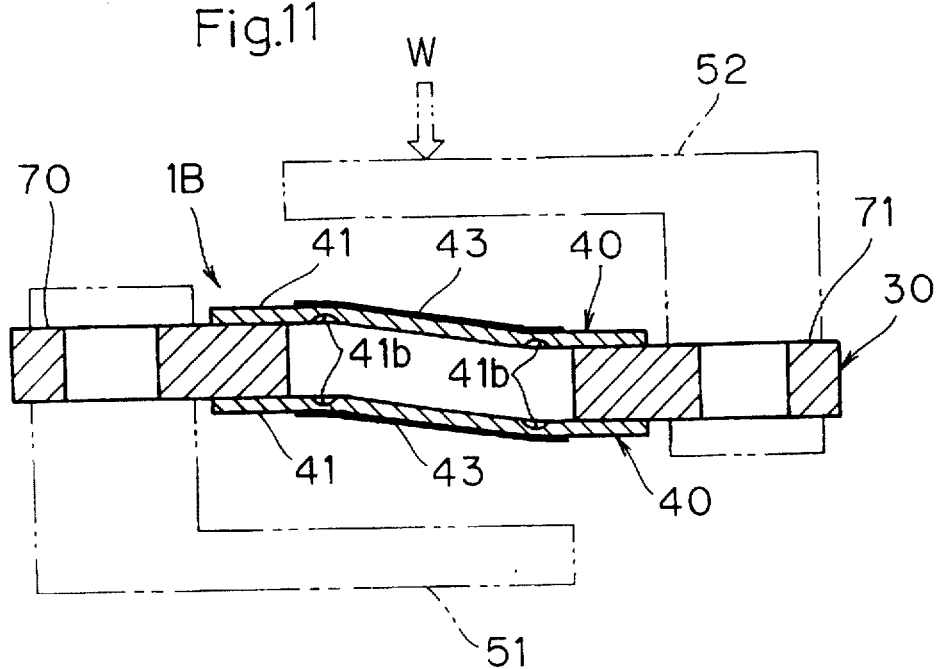
Fig. 11 is a schematic longitudinal sectional view of the load cell shown in FIG. 10 in a loaded condition.
Figure 12:
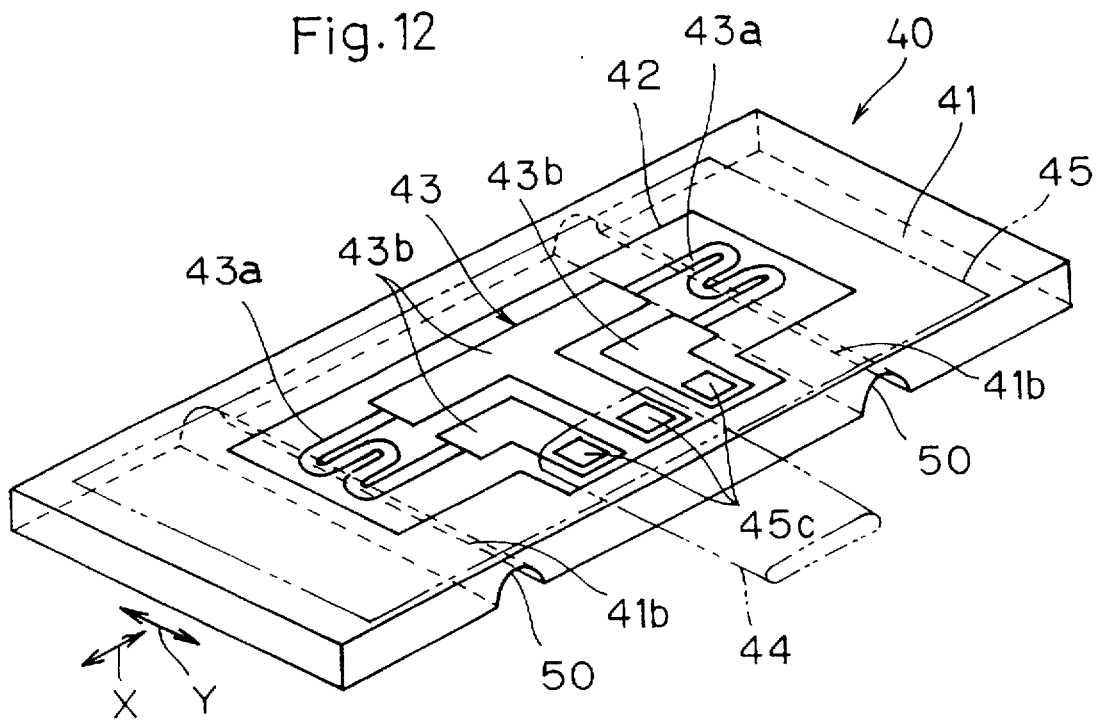
FIG. 12 is a schematic perspective view of the strain sensors employed in the load cell according to the third preferred embodiment of the present invention.

As shown in FIG. 11, the plate-like body 30 carries upper and lower strain sensors 40 positioned between the fixed rigid body forming region 70 and the movable rigid body forming region 71 with their opposite end portions 41c fixed to upper and lower surfaces of the plate-like body 30, respectively, so as to bridge over the opening 31. The upper and lower strain sensors 40 employed in the practice of the third preferred embodiment of the present invention are of a construction identical with each other. As shown in FIG. 12, each of the strain sensors 40 comprises a generally rectangular substrate 41 made of metallic material including a strain detecting element 43 deposited on one surface thereof through an insulating layer 42. The opposite surface of the respective strain sensor 40 is formed with two parallel grooves 50 at respective locations adjacent the opposite ends thereof so as to extend widthwise of the metal substrate 41 to thereby define low rigidity portions 41b. The strain detecting element 43 has a base end formed with a terminal 43c with which a cable 44 is connected.

The load cell of the type discussed above may be employed not only in the electronic scale, but also in a strain gauge and a force sensor. When a load W is imposed on the movable rigid body forming region 71 through the load receiving table 52 shown in FIG. 11, the movable rigid body forming portion 71 displaced downwardly relative to the fixed rigid body forming region 70 with the strain consequently generated in the low rigidity portions 41b of the strain sensors 40, which is in turn detected by the strain detecting elements 43. Since the plate-like body 30 is employed in the form of a single plate member, not only is the manufacture easy, but also the load cell as a whole can have a generally flat configuration and can also be assembled compact in size.

It is to be noted that although reference has been made to the use of the two strain sensors, only one strain sensor may be employed and may, in such case, be secured to either one of the upper or lower surfaces of the plate-like body 30. However, the use of the strain sensors 40 on the respective upper and lower surfaces of the plate-like body 30 is particularly advantageous in that any possible error in load measurement resulting from the difference in temperature between upper and lower portions of the plate-like body 30 can be counterbalanced, in that the linearity of the strain relative to the applied load W can be improved and in that since the upper and lower strain sensors 40 act as beam portions with respect to the plate-like body 30 the strain inducing unit 1B undergoes a deformation substantially similar to that accomplished by the well-known Roberval's parallel motion permitting the strain detecting accuracy to increase.

Figure 13:
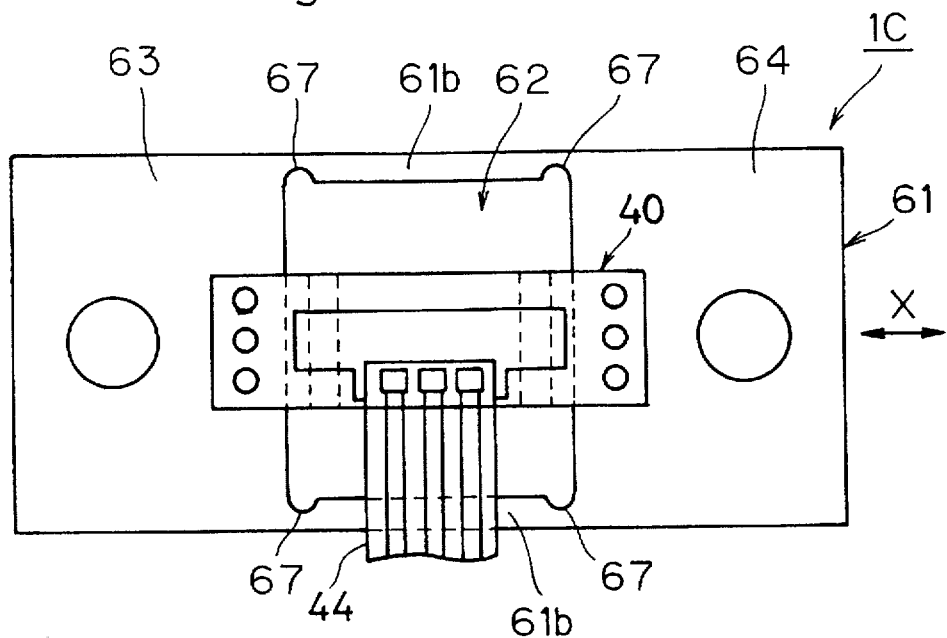
FIG. 13 is a schematic plan view of the load cell according to a fourth preferred embodiment of the present invention.

The load cell according to a fourth preferred embodiment of the present invention is shown in FIG. 13, reference to which will now be made. The strain inducing unit 1C employed in the practice of this fourth embodiment of the present invention comprises a plate-like body 61 in the form of a rectangular plate member having an opening 62 defined therein at a location intermediate of the length thereof so as to leave a fixed rigid body forming region 63 and a movable rigid body forming region 64 on respective sides thereof with respect to the lengthwise direction X, said fixed and movable rigid body forming regions 63 and 64 being connected together by means of side connecting strips 61b parallel to each other. The opening 62 is of a generally rectangular shape and has its four corners communicated with respective cutouts 67 each extending in a widthwise direction of the plate-like body 61. Because of the presence of the cutouts 67 opposite ends of each of the side connecting strips 61b are constricted to define respective low rigidity portions at the corners.

As is the case with the previously discussed third preferred embodiment of the present invention, the two strain gauges 40 are secured to the upper and lower surfaces of the plate-like body 61 and structural features other than those described above are similar to those described in connection with the load cell according to the third preferred embodiment of the present invention shown in FIGS. 10 to 12.

With the load cell according to the fourth preferred embodiment of the present invention, it will be appreciated that the amount of downward displacement of the movable rigid body forming region 64 relative to the fixed rigid body forming region 63 for a given load applied to the movable rigid body forming region 64 of the plate-like body 61 can be increased. In other words, the proportion of the load distributed between the fixed and movable rigid body forming regions 63 and 64 to the connecting strips 61b of the plate-like body 61 and the strain gauges 40 varies in a direction required to increase the proportion of distribution of the strain gauges 40 as compared with that exhibited by the case wherein no cutout 67 is employed in the plate-like body 61 at the four corners of the opening 62.

Figure 14:
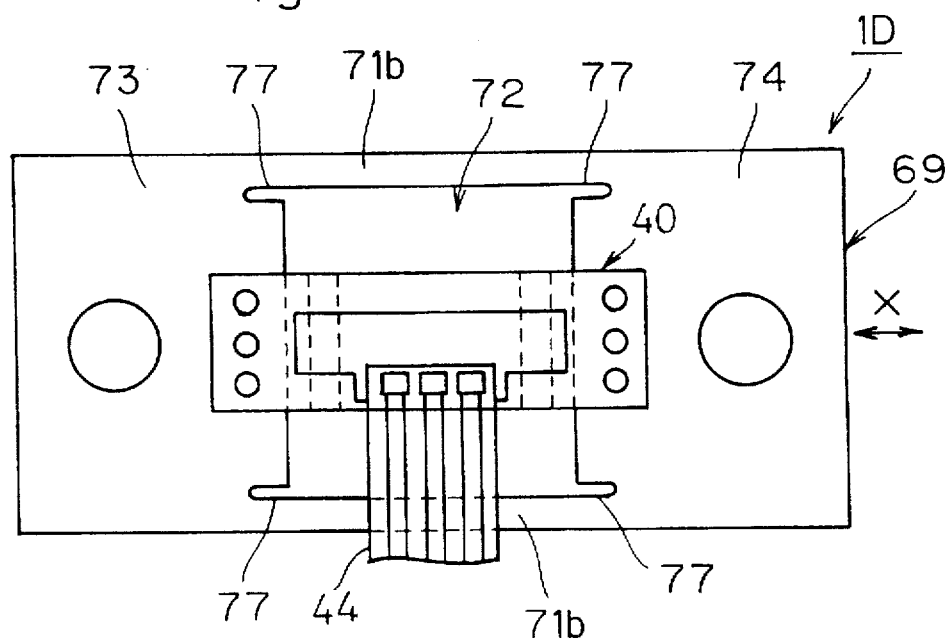
FIG. 14 is a schematic plan view of the load cell according to a fifth preferred embodiment of the present invention.
Figure 15:
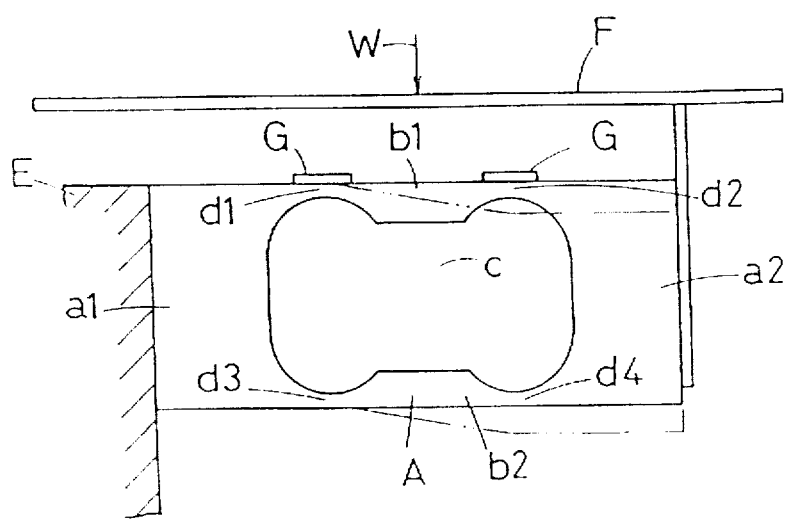
FIG. 15 is a schematic diagram showing the prior art load cell.

In the load cell according to a fifth preferred embodiment of the present invention shown in FIG. 14, the strain inducing unit 1D employed in the practice of this fifth embodiment of the present invention comprises a plate-like body 69 in the form of a rectangular plate member having an opening 72 defined therein at a location intermediate of the length thereof so as to leave a fixed rigid body forming region 73 and a movable rigid body forming region 74 on respective sides thereof with respect to the lengthwise direction X, said fixed and movable rigid body forming regions 73 and 74 being connected together by means of side connecting strips 71b parallel to each other. The opening 72 is of a generally rectangular shape and has its four corners communicated with respective cutouts 77 each extending in the lengthwise direction X of the plate-like body 69. Because of the presence of the cutouts 77 each of the side connecting strips 71b has a length substantially increased by a distance equal to twice the depth of each cutout 77.

Except for the cutouts 77 formed so as to extend in the lengthwise direction X of the plate-like body 69 from the four corners of the opening 72, the load cell shown in and described with reference to FIG. 14 is substantially similar to that described in connection with the third preferred embodiment of the present invention shown in FIGS. 10 to 12.

Even with the load cell according to the fifth preferred embodiment of the present invention, it will be appreciated that the amount of downward displacement of the movable rigid body forming region 74 relative to the fixed rigid body forming region 73 for a given load applied to the movable rigid body forming region 74 of the plate-like body 69 can be increased. In other words, the proportion of the load distributed between the fixed and movable rigid body forming regions 73 and 74 to the connecting strips 71b of the plate-like body 69 and the strain gauges 40 varies in a direction required to increase the proportion of distribution of the strain gauges 40 as compared with that exhibited by the case wherein no cutout 77 is employed in the plate-like body 69 at the four corners of the opening 72.

In other words, with the load cell of the structure shown any one of FIGS. 13 and 14, it is possible to enlarge the range of the ratio of the load inputted to the strain gauges 40 relative to the load applied to the plate-like body 61 or 69 and, more specifically, it is possible to increase the maximum permissible load by reducing the above described ratio and to increase the sensitivity by increasing such ratio.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. For example, although the strain sensor employed in any one of the foregoing embodiments of the present has been of the type having the metal substrate and the resistance elements formed on the metal substrate through the insulating layer by the use of the patterning technique, it may comprise a metal substrate having generally interdigital transducers deposited on a thin-film layer having a piezoelectric property. Where this alternative strain sensor is employed, the resonance frequency of surface acoustic waves propagating in portions of the piezoelectric thin-film layers among the interdigital transducers varies as a function of the amount of strain induced in the metal substrate and, therefore, the detection of a change in resonance frequency in time axis effectively provides an indication of the amount of the strain actually induced in the strain inducing unit.

Also, the strain sensor which has been described and shown as mounted on the plate-like body so as to bridge over the opening in the plate-like body with the opposite ends welded to the respective mounts, may be fixedly mounted on the plate-like body by any other suitable connecting method, for example, by the use of a bonding material.

Accordingly, such changes and modifications are, unless they depart from the scope of the present invention as delivered from the claims annexed hereto, to be construed as included therein.

What is claimed is:

1. A load cell for use in detecting a load imposed thereon, said load cell comprising a body (30) in which strain is induced as a function of the imposed load, and a strain sensor (40) for detecting the strain induced in the body (30);

said body (30) being a plate member having a longitudinal axis (X), said strain sensor (40) being mounted on said body (30), said body (30) having an opening (31) defined therein at a location intermediate of the length of said body (30) so as to define a fixed rigid body forming region (70) at one end thereof, a movable rigid body forming region (71) at the opposite end thereof opposite to the fixed rigid body forming region (70) in the longitudinal direction (X), and side connecting strips (30b, 30b) spaced by the opening (31) from each other in a widthwise direction (Y) of the opening (31) and connecting the fixed rigid body forming region (70) and the movable rigid body forming region (71) together; and said strain sensor (40) having opposite ends (41c) spaced in the longitudinal direction (X), said strain sensor (40) being mounted on the body (30) with its opposite ends (41c) fixed to the fixed rigid body forming region (70) and the movable rigid body forming region (71).

2. The load cell as claimed in claim 1, wherein said strain sensor (40) includes a substrate (41) and a strain detecting element (43) formed on said substrate (41) for detecting the strain, and wherein the opposite ends (41c) of said substrate (41) are fixed to the fixed rigid body forming region (70) and the movable. rigid body forming region (71) of the body (30)

3. The load cell as claimed in claim 2, wherein said substrate (41) has low rigidity areas (41b), said strain detecting element (43) being positioned on said low rigidity areas (41b).

4. The load cell as claimed in claim 3, wherein said low rigidity areas (41b) are formed in the substrate (41) so as to extend in the widthwise direction (Y).

5. The load cell as claimed in claim 3, wherein said low rigidity areas (41b) are employed in a pair, one of the low rigidity areas (41b) of the pair being spaced from the other of the low rigidity areas (41b) of said pair in a direction parallel to the longitudinal axis (X).

6. The load cell as claimed in claim 1, further comprising a first member (12) positioned above the body (30) and a second member (22) positioned below the body (30), said first member (12) and said second member (2) being coupled with the body (30);

wherein said first member (12) includes a fixed rigid body forming region (10) connected with the fixed rigid body forming region (70) of the body, a movable rigid body forming region (11) connected with the movable rigid body forming region (71) of the body (30), and an upper beam (4) connecting the fixed rigid body forming region (10) of the first member (12) and the movable rigid body forming region (11) of the first member (12) together; and wherein said second member (22) includes a fixed rigid body forming region (20) connected with the fixed rigid body forming region (70) of the body (30), a movable rigid body forming region (21) connected with the movable rigid body forming region (71) of the body (30), and a lower beam (4) connecting the fixed rigid body forming region (20) of the second member (22) and the movable rigid body forming region (21) of the second member (22) together.

7. The load cell as claimed in claim 6, wherein each of the first member (12) and the second member (22) is formed of a plate member.

8. A load measuring instrument which comprises:

the load cell as claimed in claim 1;

a base (51) for supporting the fixed rigid body forming regions (70) of the load cell; and a load receiving table (8) connected with the movable rigid body forming regions (71) for receiving the imposed load.

9. The load cell as claimed in claim 1, wherein corner portions of the opening (62) in the body (61) adjacent the fixed rigid body forming region (63) and the movable rigid body forming regions (64), respectively, are formed with corresponding cutouts (67) each extending in a widthwise direction (Y) of the body (61).

10. The load cell as claimed in claim 1, wherein corner portions of the opening (72) in the body (71) adjacent the fixed rigid body forming region (73) and the movable rigid body forming regions (74), respectively, are formed with corresponding cutouts (77) each extending in the lengthwise direction (X) of the body (71).

* * * * *